United States Patent [19]

Shebanow et al.

[11] Patent Number: 5,355,457
[45] Date of Patent: Oct. 11, 1994

[54] DATA PROCESSOR FOR PERFORMING SIMULTANEOUS INSTRUCTION RETIREMENT AND BACKTRACKING

[75] Inventors: Michael C. Shebanow, Austin; Mitchell Alsup, Dripping Springs, both of Tex.

[73] Assignee: Motorola, Inc., Schaumburg, Ill.

[21] Appl. No.: 703,531

[22] Filed: May 21, 1991

[51] Int. Cl.$^5$ ............................ G06F 9/30; G06F 9/38
[52] U.S. Cl. .................................. 395/375; 364/231.8; 364/262.4; 364/247.6; 364/933.5; 364/942.8; 364/948.34; 364/DIG. 1
[58] Field of Search ............................... 395/375, 575

[56] References Cited

U.S. PATENT DOCUMENTS

5,167,025 11/1992 Murray et al. ............... 395/375
5,201,057 4/1993 Uht .................................. 395/800

Primary Examiner—Parshotam S. Lall
Assistant Examiner—Ayni Mohamed
Attorney, Agent, or Firm—Charlotte B. Whitaker

[57] ABSTRACT

A data processing system is provided which has more general purpose physical registers than architectural (logical) registers. The data processing system uses a register inventory system to monitor the allocation state changes of each of the physical registers in a register file. As a sequencer issues instructions, an indexed random access memory (RAM) stores a copy of visible and allocation state bits for each of physical registers. When the sequencer needs to perform a branch repair, the sequencer must back up to the checkpoint where the branch instruction was issued. The visible and allocation bits for each physical register at this checkpoint are read out of the RAM. Using the information read from the RAM, and a predefined back-up deallocation relation, the register inventory system determines which physical registers to deallocate and returns those physical registers to a free pool for future allocation. The register inventory system also allows the sequencer to simultaneously retire any instructions which were completed, and discard any instructions marked by the back-up process.

9 Claims, 5 Drawing Sheets

DATA PROCESSOR FOR PERFORMING SIMULTANEOUS INSTRUCTION RETIREMENT AND BACKTRACKING

CROSS-REFERENCE TO RELATED APPLICATION

This application is related to an application entitled "A Data Processor Having a Logical Register Content-Addressable Memory ", Ser. No. 07/702,852 by Michael C. Shebanow et. al, filed May 20, 1991 and assigned to the assignee hereof.

FIELD OF THE INVENTION

This invention relates generally to data processors, and more particularly to pipelined data processors capable of simultaneously executing a variable number of instructions.

BACKGROUND OF THE INVENTION

Historically, implementations of data processors were restricted to "in-order" instruction execution. Generally, the restrictions imposed by an "in-order" execution scheme limit the performance attainable using the data processor. In contrast, allowing the use of "out-of-order" instruction execution may increase data processor performance by a factor of three (3) or more. Attaining this performance increase is hampered, however, by the requirement of maintaining precise exceptions. Exception conditions are detectable during the execution of an instruction, such as an attempt to divide by zero. In a processor implementing precise exceptions, the effects of the excepting instruction are undone and a trap is taken, such that it appears to the program that the instruction never began. Typically, known data processors which maintain precise exceptions are either expensive or restrictive with respect to the number of instructions executable per clock cycle.

In an "out-of-order" data processor, only the instruction execution occurs out of program order (sequence). Thus, instructions are still "issued" in program order, and "retirement" (the act of completing an instruction and allowing its side effects to become visible) also occurs in program order. A data dependency is said to exist between two instructions when the first instruction produces a result consumed by the second instruction. Fundamentally, only the data dependencies between instructions limit the order of instruction execution. Naturally, there are several factors which may limit the performance of an "out-of-order" data processor. The primary factor is the rate at which instructions are issued by the processor. A "conservation of instructions" property states that the average rate of instructions executed per clock is limited by the average rate of instruction issued per clock.

A secondary factor which may limit the performance of an "out-of-order" data processor is the rate of "retirement" of instructions. Initially, the processor is not executing any instructions. The processor begins fetching and issuing instructions. As previously indicated, issuance and "retirement" must occur in program order. Accordingly, until the execution of the first instruction issued by the processor is completed and retired, no subsequently issued instruction may be retired. While the processor waits to retire the first instruction, it continues to issue instructions. Thus, the processor may complete the execution of a number of subsequently issued instructions; however, the "retirement" of these subsequently issued instructions is deferred until the first instruction is completed and retired. Assuming the processor issues instructions at a constant rate, the net number of instructions in the processor is a monotonically increasing function.

A final factor which may limit the performance of an "out-of-order" processor is the branch prediction recovery time. When an instruction issuer encounters a conditional branch instruction, it has at least two possible courses of action. First, the instruction issuer can stall the issuance of the instruction. This action is undesirable in light of the primary factor affecting the processor's performance (rate of instruction issuance). Second, the instruction issuer can predict the direction of the branch and continue issuance of instructions down the predicted path. If the predicted path is incorrect, however, the register(s) affected by the incorrectly issued instructions must be restored to their original value. Thus, using the second approach maintains a high effective issue rate only if (1) the prediction is right most of the time, and (2) when the prediction is wrong, it doesn't take too long to start issuing the correct instructions. There are a significant number of algorithms capable of correctly predicting branches most of the time; however, once an algorithm is selected, the system designer has little control over what actually happens in the system at run time. When the prediction is incorrect, it is necessary to minimize the branch repair time, since as long as the branch repair is occurring, the processor cannot issue instructions. Consequently, the frequency of the stalls attributable to branch repair will adversely affect overall machine performance.

Implementing a register file in an out-of-order machine presents additional problems. The retirement restriction dictates that no side effects appear out of program order. Known processors employ reorder buffers to overcome the problem of having register side effects occur in program order. Initially, an issuing instruction reads its operand from one of a fixed number of addressable registers (e.g. general purpose registers) in a register file. Next, the instruction is issued and the associated operations are performed. If the instruction has a register destination, the specified register in the register file is not modified. Instead, a slot in the reorder buffer is allocated for the result. When the instruction completes execution, the reorder buffer is modified instead of the specified register in the register file. As new instructions issue, they read modified registers from the reorder buffer; however, unmodified registers are still read from the register file. Thus, the process of retirement entails taking the modified registers from the reorder buffer and writing them back to the register file. The rate of retirement is limited by the rate at which the processor can read the reorder buffer (the number of read ports on the reorder buffer), and write the register file. Thus, by using a reorder buffer, the system designer may achieve zero time branch repair (by throwing away the section of the reorder buffer that is no longer valid); however, the retirement rate is limited.

One solution employed to cure the ills of the reorder buffer's limited retirement rate is the implementation of a "history buffer" (history buffer). As instructions are issued, the registers requiring modification are copied into the history buffer before they are modified. Accordingly, the values in the history buffer represent "old" register values. As instructions complete execution, their results are stored directly into the register file. Thus, the process of retirement entails deciding when an instruction is complete. Typically, the processor "decides" the results of any number of instructions during a clock period, therefore, the rate of retirement is unlimited. Slots in the history buffer storing old values for "decoded" instructions are simply discarded. In contrast, when a branch repair is necessary, the rate at which the system restores the old register values will limit the branch repair time. Thus, using a history buffer, the system designer may achieve a retirement time of zero; however, the branch repair rate is limited.

Accordingly, both the reorder buffer and the history buffer perform well in accomplishing one objective, but fail to perform well in accomplishing the other. Essentially, the problem is that both approaches (reorder buffer and history buffer) require the physical movement of data. The reorder buffer moves data in the act of retirement. Whereas, the history buffer moves data in the act of branch repair. Thus, it is desirable to provide a mechanism which accomplishes the foregoing objectives without physically moving data.

SUMMARY OF THE INVENTION

A data processing system is provided which has a predetermined number of execution units for simultaneously executing a plurality of instructions issued by a sequencer, and a plurality of numbered physical registers in a register file for selectively storing information resulting from execution by said execution units of each of the predetermined number of instructions. The data processing system includes a system for performing instruction retirement comprising retirement logic for monitoring an allocation state change of each of the physical registers, in response to the sequencer advancing from a first consistent checkpoint to a subsequent retirement checkpoint.

DETAILED DESCRIPTION OF A PREFERRED EMBODIMENT

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false.

Figure 1:
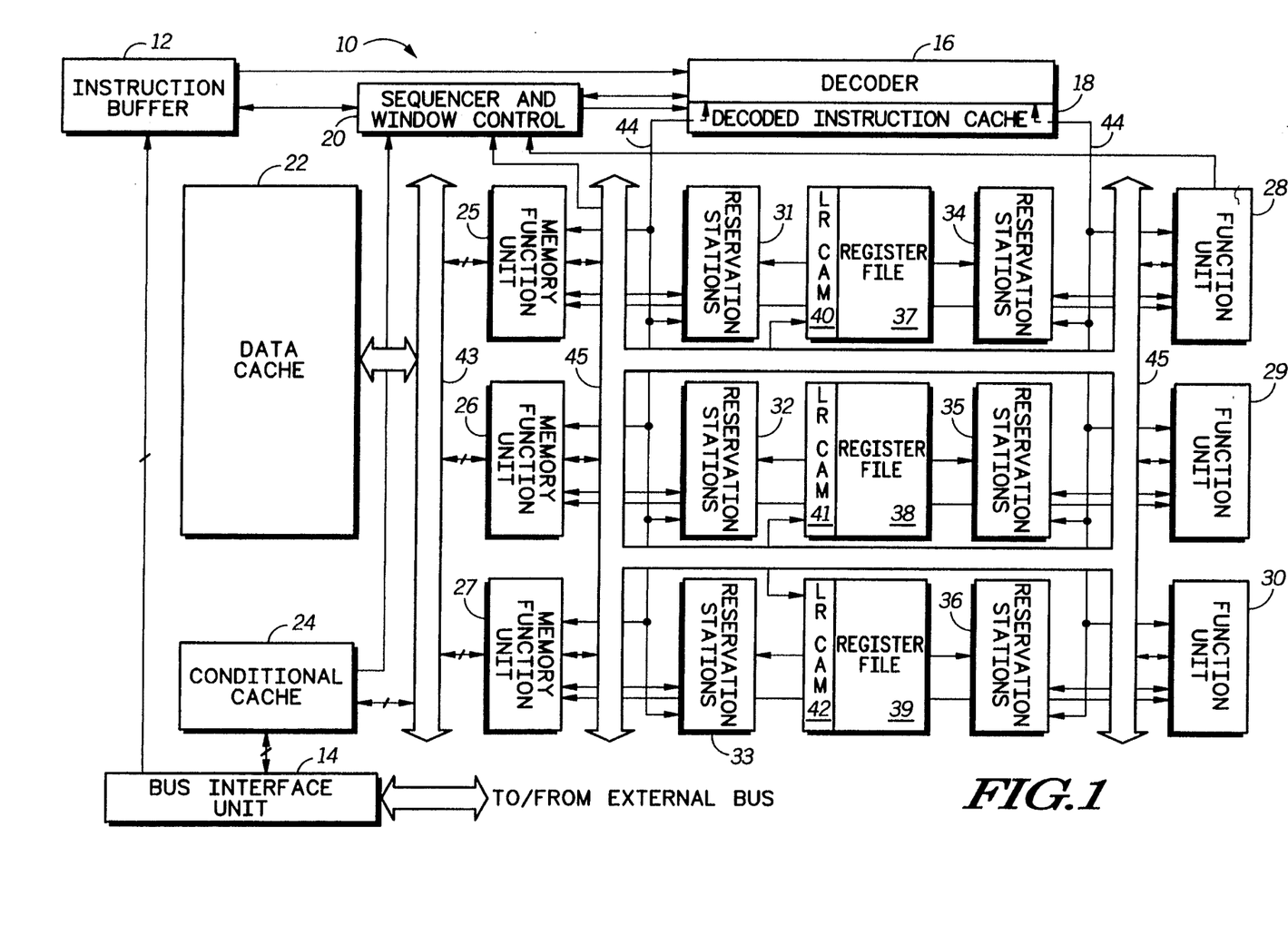
FIG. 1 is a block diagram illustrating a preferred embodiment of a data processing system of the present invention.

The present invention may be implemented in a variety of computer system environments. Accordingly, the data processing system 10 of FIG. 1 is provided for illustrative purposes only, and is not intended to limit the scope of the invention. Shown in FIG. 1 is a block diagram of a data processing system 10 in accordance with a preferred embodiment of the present invention. In operation, an instruction buffer 12 fetches a number of memory locations from an external memory (not shown) via a bus interface unit 14. A decoder 16 reorganizes the information stored at the memory locations into a "packet", where each packet consists of one to six instructions. A decoded instruction cache (DIC) 18 receives the decoded packets from the decoder 16 and stores the packets (predecoded groups of instructions) pending their selection by a sequencer and window control logic unit (SEQUENCER) 20. The DIC 18 functions as a source of packets for an instruction bus 44. Alternatively, the decoder 16 may directly provide an instruction packet to the instruction bus 44.

In the preferred embodiment, DIC 18 functions in a similar manner as a conventional instruction cache with the exception that the instructions are predecoded. Instruction issuance occurs when the SEQUENCER 20 selects a packet for execution, and the DIC 18 provides the decoded instructions in the selected packet to one or more sets of stations in a group of reservation stations 31-36. In the preferred embodiment, when the data operands for an issued instruction are not available, the instruction is stored in a reservation station pending the availability of the required data. Once the requisite data operands are available, the instruction is transferred from a reservation station (in one of the group of reservation stations 31-36) to a function unit 25-30, respectively, for execution. A conditional cache 24 provides a storage area for: (i) partially completed memory instructions, (ii) completed but not retireable memory instruction, and (iii) completed and retired memory operation data, thereby insuring that memory operations are executed in the correct order.

In accordance with the preferred embodiment, function units 25-30 are coupled to a distribution bus 45 which comprises six (6) independent buses each with their own conventional bus driver logic (not shown). Upon completing execution of an instruction packet, the respective function unit 25-30 drives the information out onto the independent bus dedicated to the respective function unit. Accordingly, only the outputs of the function units 25-30 drive the six (6) independent buses of the distribution bus 45. The SEQUENCER 20 monitors the distribution bus 45 to determine whether an instruction packet has successfully executed. In the preferred embodiment, the SEQUENCER 20 does not read the data placed on the distribution bus; however, SEQUENCER 20 does detect which instructions have distributed information, and thereby ascertains the completion of an instruction packet. The SEQUENCER 20 functions to limit the number of active instruction packets (where active means issued but not yet retired) present in the data processing system 10 at any given time. If the number of instruction packets currently present in the system 10 does not exceed a predefined limit, the SEQUENCER 20 will continue to issue instructions from either the instruction buffer 12 or the DIC 18.

The architectural (logical) registers are those which a program manipulates during instruction execution. In registers files 37–39 there are more physical registers than logical (architectural) registers. In accordance with the present invention, register files 37–39 are logically equivalent to each other, therefore, each register file 37–39 contains at all times identical information. At system reset, each logical register of the instruction set architecture being emulated by the data processing system 10 is assigned a physical register, in register files 37–39, to represent it. Physical registers assigned to a logical register are referred to as "visible". Since there are more physical registers in register files 37–39 than there are logical (architectural) registers, the balance of the physical registers are not assigned to a logical register at reset. Thus, the physical registers in register files 37–39 which are not assigned at reset form a "free" pool. The physical registers in the free pool are referred to as "invisible". At any one time, there exists exactly one physical register representing each logical register. Accordingly, for each instruction, source logical registers to be read are first translated from a logical to a physical register. All currently visible physical registers are searched as part of this process.

Figure 2:
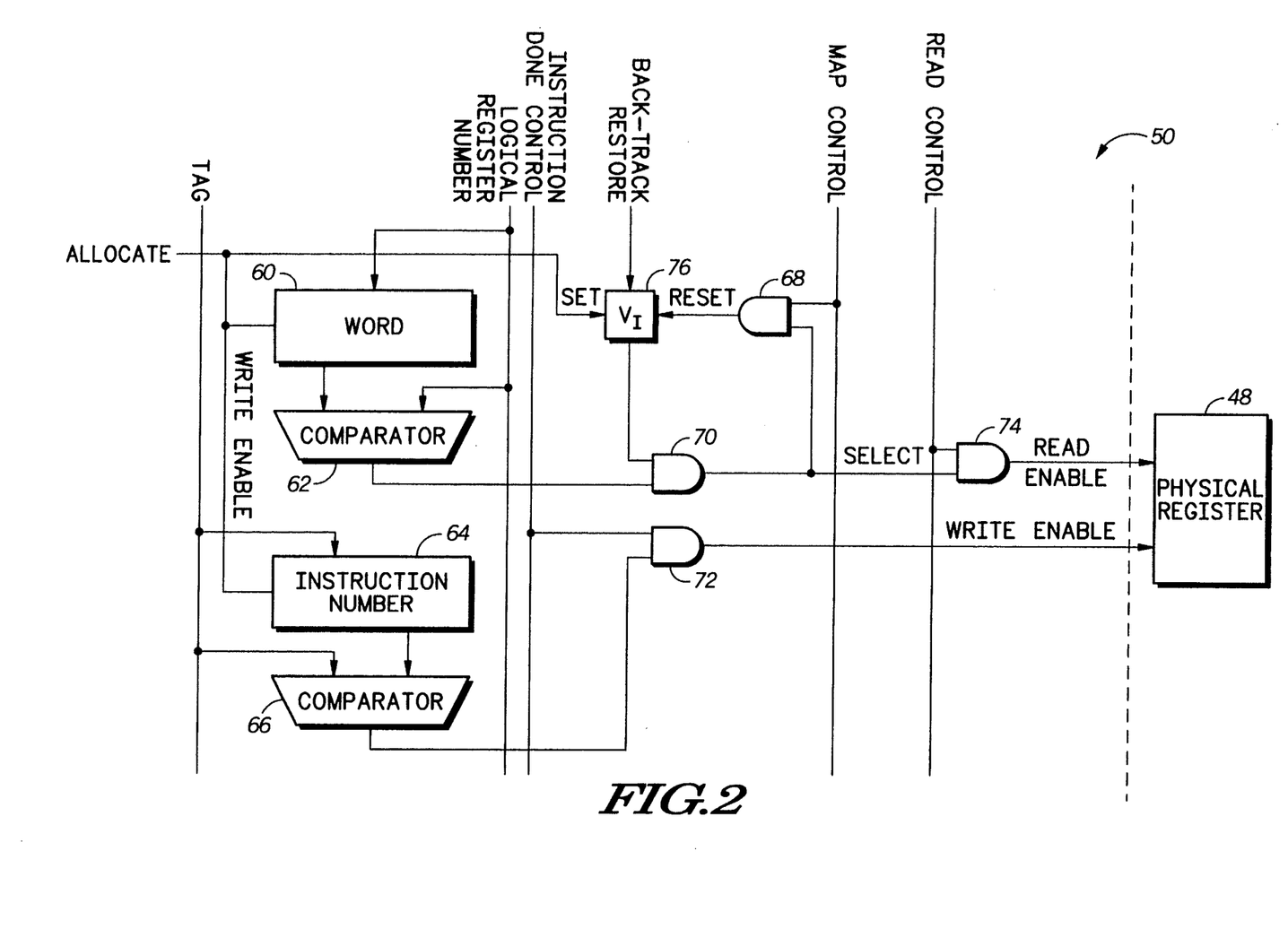
FIG. 2 is a block diagram illustrating a logical register content addressable memory (LRCAM), of the data processing system of FIG. 1, in accordance with the present invention.

During the instruction issuance process, physical registers assigned to logical registers are read from the register files 37–39. In the present invention, the translation (selection of the physical register) is performed using Logical Register Content-Addressable Memories (LR CAMs) 40–42, which are comprised of a predetermined number of CAM cells 50 (FIG. 2). As shown in FIG. 2, each physical register 48 in register files 37–39 has a LR CAM cell 50 associated with it. Stored in a word latch 60 of each LR CAM cell 50 is a number identifying which logical register is currently assigned to the associated physical register 48. Similarly, stored in a latch 76 is a visibility ($V_I$) flag bit indicating whether the physical register 48 is currently visible. In translating a logical register to a physical register 48, the logical register number is simultaneously applied to each cell 50 in the LR CAMs 40–42. Each cell 50 compares the logical register number to be translated to the number stored in word latch 60. If the two logical register numbers match, and the V flag bit identifies the associated physical register 48 as being visible, then the physical register 48 associated with the matching LR CAM cell 50 is used as a source for the logical register being translated (i.e. read).

As previously indicated, at reset each logical register is allocated to a physical register to represent it. During allocation, which occurs after the physical registers have been read, the V flag bit stored in the visibility latch 76 is set by an ALLOCATE control signal. In a preferred embodiment of the present invention, the translation from logical to physical register is performed accordingly. During translation, the READ CONTROL signal is asserted, and the MAP CONTROL signal is negated. A comparator 62 compares the source logical register number to the number stored in the word latch 60 and provides the logical result of the comparison to AND gate 70. When a comparison match occurs, AND gate 70 receives a logic high output signal from the comparator 62, and a logic high signal from visibility latch 76, and provides a logic high SELECT signal to AND gates 68 and 74, in response thereto. In response to the logic high SELECT signal, and the logic high READ CONTROL signal, AND gate 74 asserts a READ ENABLE signal, thereby enabling the contents of physical register 48 to be read. Since the MAP CONTROL signal is negated, AND gate 68 does not reset the V flag bit stored in the visibility latch 76. Thus, the SELECT signal is used to read the physical register 48. This direct selection of the physical register 48 reduces the access latency to the data.

In accordance with the present invention, register mapping and remapping also make use of the LR CAMs 40–42. Instead of using the SELECT signal to read a physical register, the SELECT signal is used to reset the $V_I$ flag bit of a matching physical register. After the source logical registers are translated, the destination logical registers to be written are assigned ("mapped") to physical registers allocated from the free pool. During register mapping, an allocator (not shown) uses a register allocation algorithm to select a set of physical registers to be allocated, and asserts an ALLOCATE signal. The assertion of the ALLOCATE signal in turn causes the assertion of a WRITE ENABLE signal, which enables the logical register number and instruction number to be stored in latches 60 and 64, respectively. Thus, a new physical register is assigned to store the value of each destination logical register produced by an instruction using that destination logical register. The LR CAM cell 50 for the newly assigned physical register is modified to represent a destination logical register by storing the destination logical register number in the word latch 60 of the LR CAM cell 50, and modifying the $V_I$ bit flag in the visibility latch 76 to indicate that the physical register is now visible.

Physical registers previously assigned ("allocated") to the destination logical registers must be unmapped, and made "invisible". During unmapping, the MAP CONTROL signal is asserted. The destination logical register number is applied to all LR CAM cells 50. Comparator 62 compares the destination logical register number to the logical register number stored in latch 60, and the result is provided to AND gate 70. When a match occurs, and the $V_I$-flag bit in latch 76 is set, AND gate 70 provides a logic high SELECT signal to AND gate 68. AND gate 68 receives the SELECT signal and the MAP control signal, and resets the $V_I$-flag bit in latch 76, in response thereto. During unmapping, the READ CONTROL signal is negated, therefore, AND gate 74 does not assert the READ enable signal. Essentially, for any LR CAM cell 50 whose $V_I$ bit flag indicates visibility, and whose word matches the destination logical register number, the $V_I$ bit flag is modified (reset) to indicate that the physical register is no longer visible. In the preferred embodiment, data processing system 10 determines which physical register is allocated before the actual mapping of the that physical register. Thus, the use of the LR CAMs 40–42 eliminates the need for the mapping tables used in the prior art, which involve one level of indirection to implement the register renaming.

Figure 3:
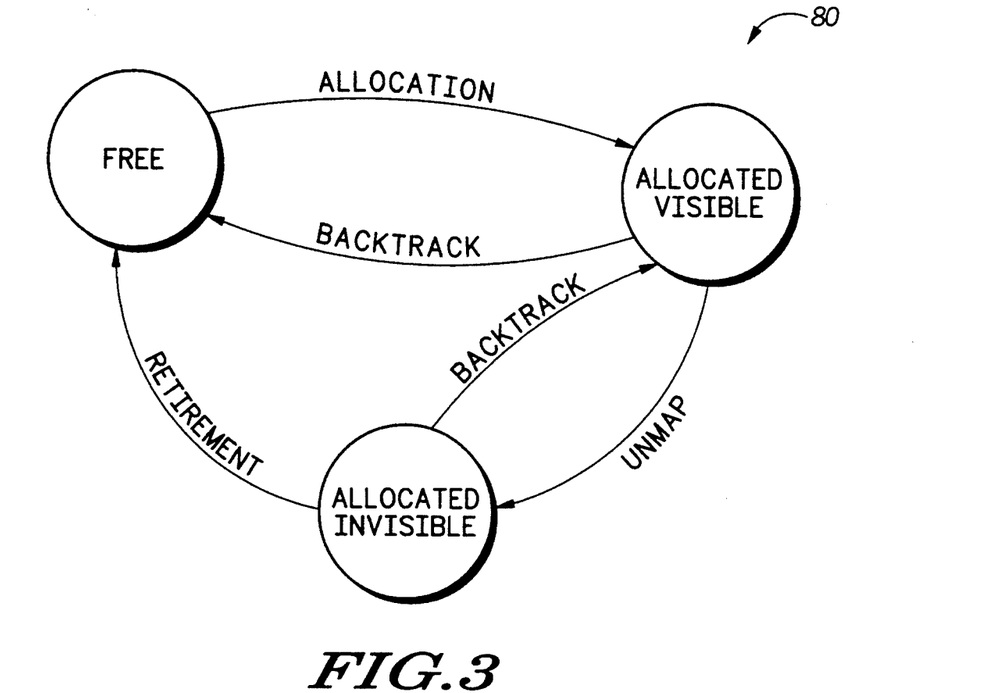
FIG. 3 is a register state diagram for the physical registers of the data processing system of FIG. 1, in accordance with the present invention.

In accordance with the present invention, the process of sourcing logical registers using the register files 37–39, and assigning logical registers to new physical registers in the register files 37–39 is referred to as instruction "issuance". Retirement of an "issued" instruction "A" is allowed to occur when data processing system 10 completes the execution of instruction "A", and the execution of all instructions issued prior to instruction "A" is also complete. FIG. 3 illustrates a register state diagram 80 for the issuance, backtrack, and retirement processes. SEQUENCER 20 issues an instruction and the operands for that instruction are read from source logical registers, which are translated into physical registers in register files 37-39. Upon completion of the instructions, the results are written back to destination physical registers assigned to physical registers taken from the free pool. As previously indicated, source logical registers are assigned (mapped) to physical registers taken from the free pool during instruction issuance.

After the source logical registers are mapped, the destination logical registers to be written are assigned to physical registers allocated from the "free" pool, and these physical registers become "allocated visible" registers. During this allocation process, any physical registers previously assigned to these destination logical registers are unmapped, and the unmapped physical registers become "allocated invisible" registers. Upon instruction completion ("retirement") the allocated invisible registers are returned to the free pool, and the process continues. The process of returning previously assigned physical registers to the free pool is referred to as "deallocation".

As the SEQUENCER 20 issues instructions it sets a flag bit in a conventional scoreboard. During the instruction execution process, the instructions are tagged, and indexed to indicate when an instruction is complete (DONE), or when an error occurred during execution of the instruction. Upon completing the execution of a given instruction, the function units 25-30 distributes the information onto the distribution bus 45, which is monitored by the SEQUENCER 20. The function units 25-30 also assert an INSTRUCTION DONE CONTROL signal for the given instruction, and transfer the TAG number corresponding to the completed instruction, along with the destination logical register number to the LR CAMs 40-42, via the distribution bus 45. A comparator 66 in the LR CAMs 40-42 compares the TAG number to an instruction number stored in latch 64, and provides the result of the comparison to AND-gate 72. When a match occurs, AND-gate 72 asserts a WRITE ENABLE signal, thereby allowing the function unit 25-30 to directly write the result of the executed instruction to the physical register 48 in register files 37-39.

In the preferred embodiment, data processing system 10 employs a branch prediction algorithm to predict the outcome of the execution of a branch instruction (hereinafter referred to as "branch prediction"), prior to the execution of that branch instruction. Consequently, it is possible that the SEQUENCER 20 may incorrectly issue a stream of instructions based upon a faulty branch prediction. When a faulty branch prediction occurs, correct emulation of the instruction set architecture requires that the data processing system 10 undo any state changes that result from the incorrectly issued instructions (hereinafter referred to as "backtracking"). If during the process of incorrectly issuing these instructions physical registers were unmapped (unassigned), and if these physical registers were also deallocated, the system 10 would not be able to perform the backtracking operation. It is, therefore, imperative that the unmapped physical registers are deallocated only when the instructions actually retire. Deallocation after retirement enables the data processing system 10 to perform the backtracking operation when a faulty branch prediction occurs, and insures that the unmapped physical register is no longer needed by the data processing system 10.

Since physical registers in register files 37-39 are mapped and unmapped each time the SEQUENCER 20 issues an instruction, system 10 must maintain an inventory of those physical registers which were allocated or deallocated. This inventory system must enable the system 10 to recover physical register resources which are no longer visible, upon the retirement of an instruction or group of instructions. The recovery of the physical register resources facilitates their re-usage by subsequent instructions issued by the SEQUENCER 20. Using the LR CAMs 40-42, system 10 maintains information pertaining to the mapping, unmapping and visibility of the physical registers in the register file 37-39. Each physical register in register file 37-39 has an associated register inventory system, which includes a random access memory (RAM). The RAM stores the visible bits for all CAM cells 50 in the LR CAMs 40-42, which are herein referred to as "checkpoints". Thus, the register inventory system maintains a copy of the machine state of system 10 in a predetermined number of random access memories (RAM). After the SEQUENCER 20 issues each instruction, a copy of the machine state of system 10 is made in RAM, and the issue point is advanced for the next instruction issuance.

Figure 4:
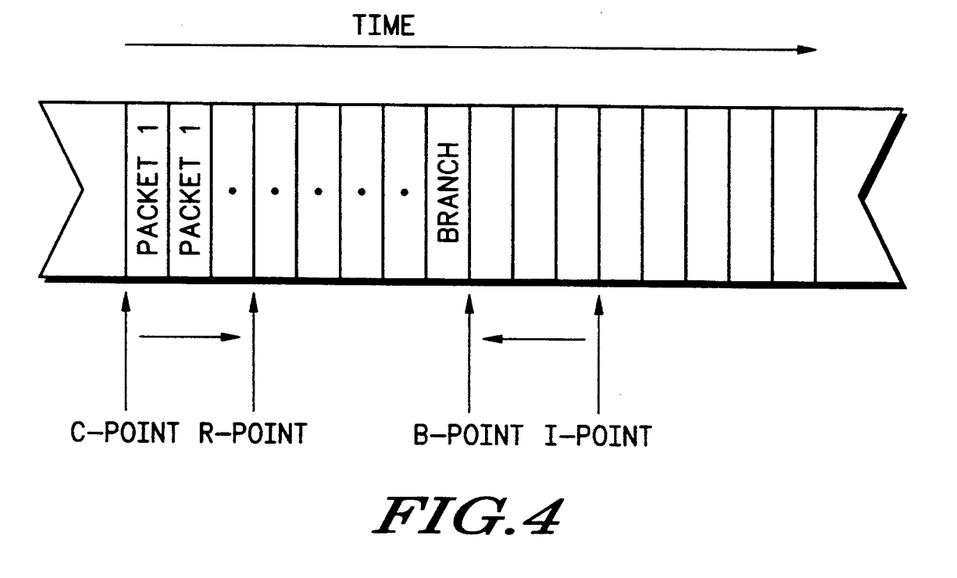
FIG. 4 is a diagram illustrating the progression of instruction issuance in the data processing system of FIG. 1.

FIG. 4 illustrates the progression of the SEQUENCER 20 during instruction issuance. A consistent checkpoint (C-POINT) of the system 10 represents the machine state checkpoint just after the retirement of the last instruction, and just before the retirement of the next instruction. The instruction issuance logic of SEQUENCER 20 progresses by advancing the C-POINT of the machine forward as fast as possible. The boxes between the points represent an instruction or a group of instructions ("packets"). The retirement checkpoint (R-POINT) represents the place where the SEQUENCER 20 can advance. The issue checkpoint (I-POINT) point of system 10 is the checkpoint just past the last instruction issued. The backup checkpoint (B-POINT) represents a checkpoint just prior to issuance of a set of instructions to be discarded due to the occurrence of a branch prediction mistake or exception condition. Consequently, backup may never occur before the current retirement point, since by definition retirement only occurs when an instruction is complete. Thus, SEQUENCER 20 of system 10 attempts to advance the issue point as far forward from the consistent point as possible, while simultaneously minimizing the amount of backup required.

In accordance with the present invention, set notation will be used to explain the technique employed by system 10 to perform and maintain an inventory of the register allocation. For simplification purposes, a set of values is hereinafter denoted in boldface text (i.e. $V_I$) whereas, a distinct value or member of the set will be denoted in plain text (i.e. $V_I$). Accordingly, for illustrative purposes only, the set of all physical registers in register files 37-39 is defined as U (the universe). At system reset, the allocated visible registers are defined as the set of visible registers at the consistent state checkpoint $V_C$. Similarly, the set of visible registers at: a candidate retirement point is defined as $V_R$; a backup point $V_B$; and an issue point $V_I$. The set of all unallocated physical registers is defined as the free (F) set, which comprises all physical registers which have not been assigned to a logical register. Consequently, the set of all allocated (A) registers is defined by the set of all physical registers in register files 37-39 (universe U) minus the set of all unallocated physical registers (free F), which in set notation equals the quantity U-F, where the "−" operator denotes the set difference.

Accordingly, as the SEQUENCER 20 issues instructions, a logical register is mapped to a physical register which becomes both visible and allocated. When the logical register is assigned to a new physical register, the old physical register becomes invisible (unmapped); however, this old physical register remains allocated until the instruction which caused the register allocation is retired. Essentially, in the present invention, a physical register which is visible must be allocated; however, a physical register which is allocated need not be visible. Thus, at the consistent point, a backward view in time of all instructions previously retired yields the relation $V_C = A_C$, where $A_C$ is the set of allocated registers at the consistent point. Simply stated, the set of visible registers at the consistent checkpoint (at reset) $V_C$ equals the set of allocated registers at the consistent point $A_C$. Essentially, assuming the SEQUENCER 20 had not issued any instructions, all visible physical registers are also allocated. Invisible registers cannot be made visible again, since backup behind the consistent point is not allowed. Consequently, any such invisible register must also not be allocated.

As the SEQUENCER 20 issues instructions, the set of allocated physical registers grows in size, while the set of visible registers remains constant in size. This occurrence is attributable to the fact that when a physical register is unmapped, system 10 will not deallocate that physical register until the instruction which unmapped it retires. Thus, set notation may also be used to define the physical register allocation at the various checkpoints. Accordingly, the set of allocated registers at the issue checkpoint ($A_I$) is a superset of the set of allocated registers at backup ($A_B$), which is a superset of the set of allocated registers at the consistent point ($A_C$).

Figure 5:
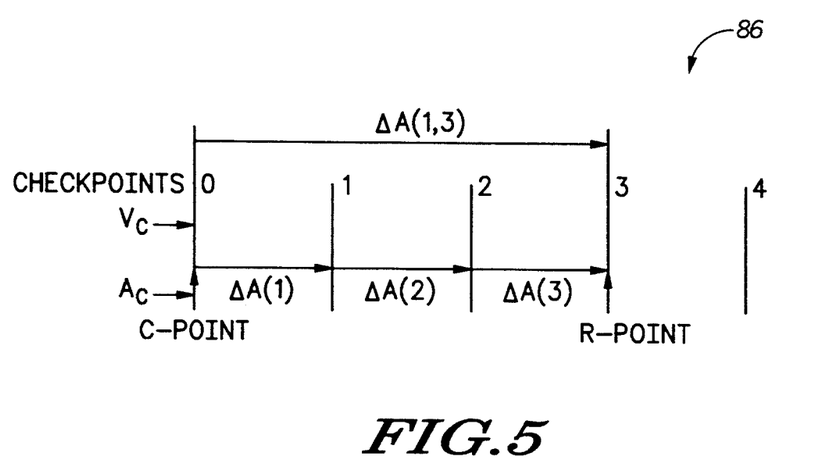
FIG. 5 is a diagram illustrating an instruction retirement scenario, in accordance with the present invention.

Shown in FIG. 5 is a diagram illustrating a retirement scenario 86 for the system 10, in accordance with the present invention. In the retirement scenario 86, system 10 is retiring three checkpoints (C0, C1, and C2), and the corresponding three groups of instructions. The act of retirement will deallocate any physical register that was allocated by system 10 (prior to the R-point), and that is no longer visible. In the present invention, there are two rules which govern the consequences of the act of retirement with respect to register deallocation. The first rule is based upon the assumptions that the physical register 48 is no longer a member of the set of visible registers at the retirement point ($V_R$), and that the SEQUENCER 20 is advancing the system 10 from the consistent point (C-point) to a retirement point (R-point). In the first case, a physical register 48 in register files 37–39 was mapped to a logical register prior to the C-point. Under the first rule, this physical register 48 is a member of sets $V_C$ (the set of visible registers at the consistent point) and $A_C$ (the set of allocated physical registers at the consistent point). When system 10 advances from C-point to R-point, and physical register 48 is not visible at R-point, then the register inventory system ascertains that physical register 48 was unmapped by some instruction issued between C-point and R-point. Essentially, since $V_C = A_C$, and the set $A_C$-$V_R$ represents the physical registers deallocated, the register inventory system uses the set relation $V_C$-$V_R$ to define the physical registers that are deallocated and added to the free set F after advancing C-point to R-point.

A second rule is based on the assumption that physical registers were allocated between the C-point and the candidate R-point, as illustrated in FIG. 5 by the quantity $\Delta A(1,3)$. Essentially, the instructions issued by the SEQUENCER 20 between the C-point and the R-point caused the removal of physical registers from the free set, and the assignment (allocation) by the LR CAMs 40–42 of these physical registers as destination registers to be written. Thus, in the second case, it is conceivable that a physical register 48 could be allocated at one issue point and promptly deallocated at the next issue point, as a result of two successive writes to the same logical register, for example. Since in the second case, the physical register 48 was not visible at the C-point, and will not be visible at the R-point, the first rule does not govern. Consequently, in the second case, the set relation to define the physical registers that are deallocated is $\Delta A$-$V_R$, where $\Delta A$ is the set of physical registers allocated between the C-point and the R-point. Essentially, $\Delta A$-$V_R$ represents the set of physical registers allocated between the two checkpoints (i.e. A1,3) that are no longer visible. The two set relations may be combined to form an overall retirement deallocation relation, $(\Delta A + V_C)$-$V_R$, where the '+' operator represents set union. The determination of the quantity $\Delta A$ presents some subtle difficulties. Merely recording the set of all allocated physical registers at each checkpoint $A_C$, and then defining $\Delta A$ as $A_R$-$A_C$ is an inadequate method for in certain circumstances.

Figure 6:
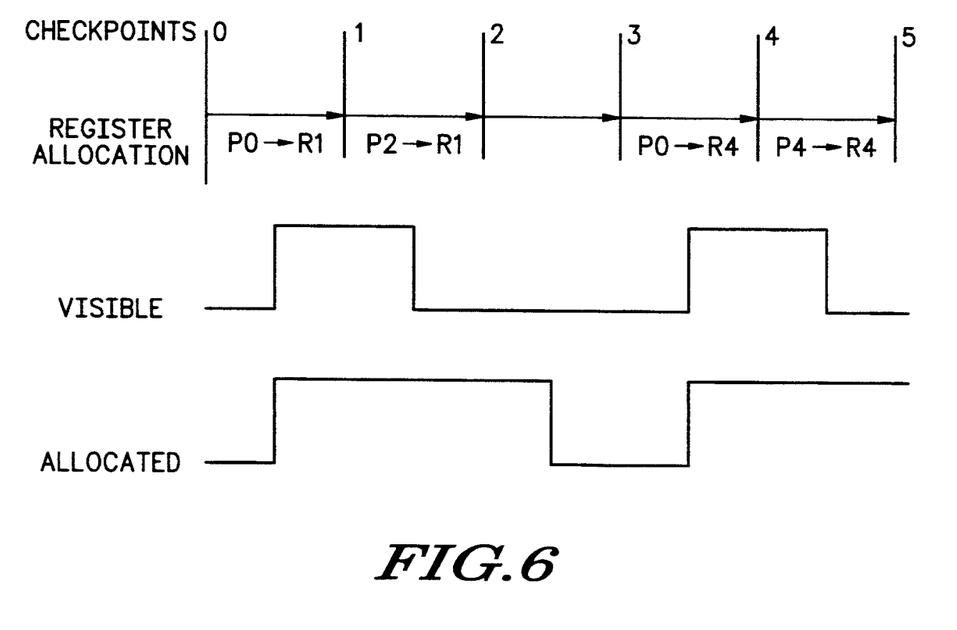
FIG. 6 is a diagram illustrating an alternate method for defining a retirement deallocation scheme.

FIG. 6 illustrates an example of one such case when recording the set of all allocated physical registers at each checkpoint $A_C$, and then defining $\Delta A$ as $A_R$-$A_C$ is an inadequate method for defining the overall retirement deallocation scheme. In FIG. 6, "PX" represents a physical register number 'X'; and 'RX' represents a logical register number 'X'. Initially, the system 10 is empty. As the SEQUENCER 20 begins to issue instructions, the register inventory system 90 (FIG. 7) begins to make a record of which physical registers were visible ($V_I$), and what physical registers were allocated ($A_I$) at each issue checkpoint. In the present example, the SEQUENCER 20 issues a first instruction which maps logical register R1 onto physical register P0 at checkpoint C1. In FIG. 5 the visible and allocated waveforms represent the state changes of physical register P0. Thus, at C1, physical register P0 is a member of $A_1$, the set of registers allocated at C1. As indicated by the visible and allocated waveforms, physical register P0 is now both visible and allocated.

In the next cycle, the SEQUENCER 20 issues an instruction which unmaps physical register P0 and maps logical register number R1 to physical register number P2. Now, both physical registers P0 and P2 are members of $A_2$ (the set of all registers allocated at checkpoint C2), even though P0 is not a member of $V_2$ (the set of all registers visible at checkpoint C2). In the third cycle, the retirement logic of SEQUENCER 20 advances the consistent point to checkpoint C2. Physical register P0 should be deallocated, since it cannot be made visible again. Using the relation of $\Delta A = A_R$-$A_C$, and inserting this into the retirement deallocation equation, $((\Delta A + V_C)$-$V_R)$, the register inventory system 90 will correctly deallocate P0. If SEQUENCER 20 issues a branch instruction C3, no allocation or unmapping of register will occur. During the next clock, SEQUENCER 20 issues an instruction which causes a write to logical register R4, which causes the allocation of P0. Consequently, P0 becomes both visible and allocated. In the following clock, another instruction again writes to logical register R4, thereby causing physical register P0 to become invisible, but not deallocated.

During the 'x' clock period, the retirement logic of SEQUENCER 20 advances the consistent state to C5. Since P0 is a member of $A_2$, and C2 was the old consistent point, any future difference evaluation of $\Delta A$ will not include P0. Thus, if logical register R4 is mapped again to another physical register, and system 10 retires to the point where R4 was mapped, the difference equation $\Delta A$ will not deallocate P0. This anomaly will cause physical register P0 to become a "lost" register, since it will never enter the free pool, and thus, will never be available for reallocation.

The anomaly is caused by the representation of allocation as set membership, whereby a physical register is a member of a set A or it is not, thus, making allocation correspond to a return to zero (RZ) encoding. In the present invention, allocation corresponds to a non-return to zero encoding (NRZ). Essentially, in the present invention, exclusive set difference is used to represent allocation, rather than an inclusive set difference. The exclusive difference of "x and y" is represented by the function (either x or y, but not both); whereas, inclusive difference of "x and y" is represented by the function (either x or y). The advantage of using exclusive set difference is that it represents allocation as a change in physical register membership rather than an absolute membership. Thus, the difference equation $\Delta A = (\alpha_c \wedge \alpha_r)$, where the operator " " is exclusive set difference. Furthermore, a change in set notation to represent NRZ encoding is used. Accordingly, rather than use A to represent the set of allocated physical registers, the symbol $\alpha$ is used to represent a set of physical register allocation changes; whereby $\alpha_c$ represents the register allocation changes at the consistent point, and $\alpha_r$ represents the register allocation changes at the retirement point.

The set of physical registers chosen for allocation, at reset, may be arbitrary. Referring again to the retirement scenario 86 of FIG. 5, initially the set $\alpha_0$ is empty. In between checkpoint C0 and C1, physical register P0 is allocated to logical register R1, and therefore, physical register P0 becomes a member of $\alpha_1$. Accordingly, the visibility flag bit of physical register P0 is set in the visibility latch 76. In between checkpoints C1 and C2, physical register P2 is allocated to logical register R1, causing the visibility flag bit of register P0 to be reset. Since physical register P0 was not re-allocated in between C1 and C2, and C2 and C3, it is also a member of sets $\alpha_2$ and $\alpha_3$. In between checkpoints C3 and C4, physical register P0 is re-allocated to represent logical register R4, therefore, physical register P0 is once again visible. Using the exclusive difference equation, we remove physical register P0 from set $\alpha_4$. Notice that in the evaluation of $\Delta A$ using NRZ encoding, both $(\alpha_0 \ \alpha_2)$ and $(\alpha_2 \ \alpha_5)$ include P0 as a member. Consequently, there is no lose of the physical register P0 as in the case of the second example, described above. This is due to the fact that at most one transition of alpha, for any physical register, may exist between the current consistent point and the current issue point. Thus retirement of any arbitrary number of checkpoints may be performed using the alpha NRZ encoding of allocation.

Figure 7:
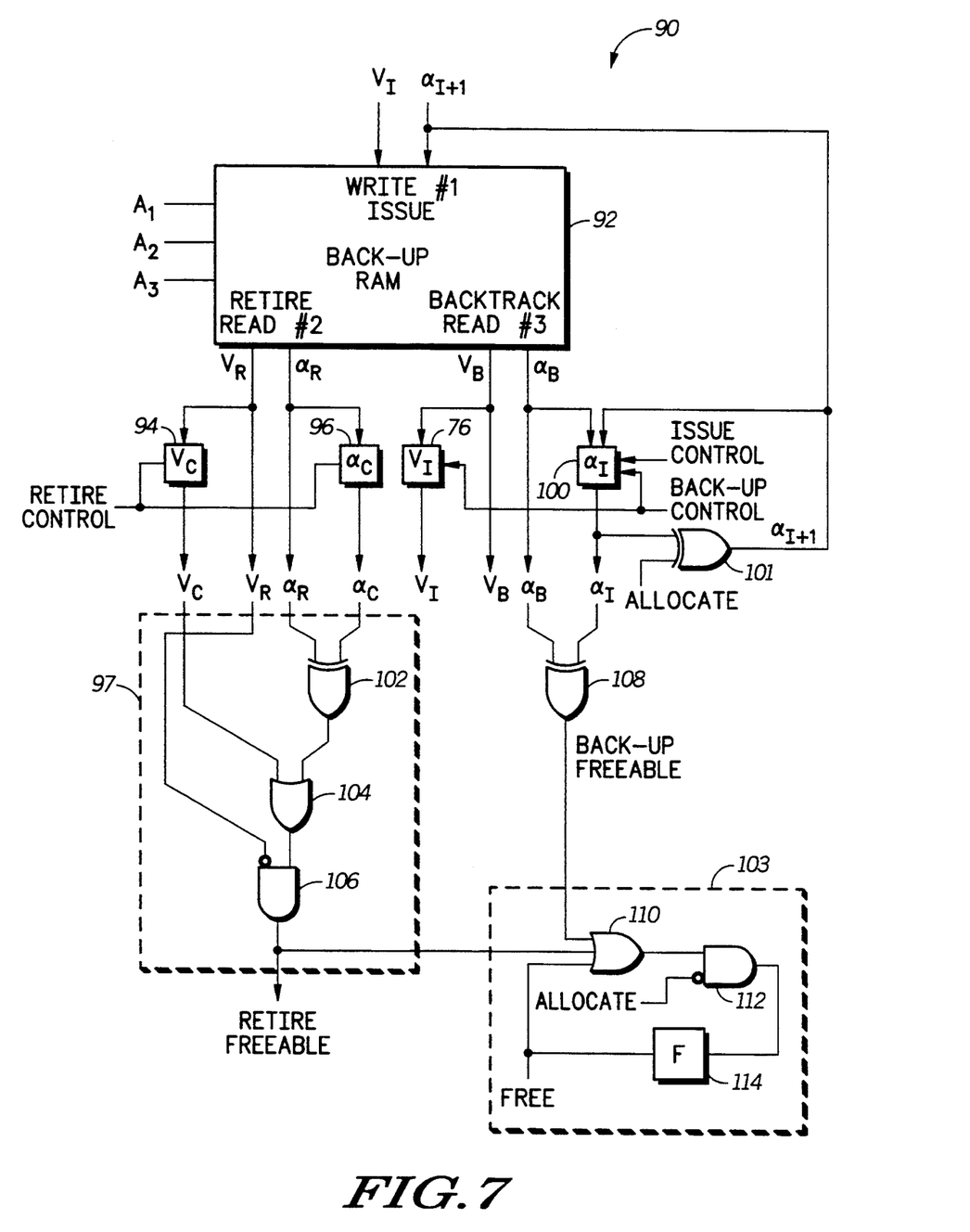
FIG. 7 is partial schematic diagram illustrating a single register inventory system of the LRCAM of FIG. 2.

The backup and issuance processes also benefit from the NRZ encoding of the physical register allocation. In the case of issuance, for every physical register allocated, the register inventory system 90 will invert the physical registers membership in the next alpha vector, with respect to the last issued alpha vector. Thus, yielding a deallocation equation for issuance $\alpha_I = (\alpha_{I-1} \wedge$ {allocated}), where the quantity "I-1" represents the last issued checkpoint and "I" represents the checkpoint currently being issued. In the case of backup, the above process is reversed. Using the selected backup checkpoint, the register inventory system 90 restores both the alpha value ($\alpha$) and the visibility bit ($V_I$) of the associated physical register to the state they had at the time the checkpoint was issued, and deallocates any physical registers which were allocated between the issue checkpoint and the backup checkpoint. Accordingly, during the backup process the NRZ encoding is defined by a deallocation equation for backup $= (\alpha_B \ \alpha_I)$, where B and I are the backup and last issue point, respectively. Since the SEQUENCER 20 will never backup to a checkpoint before the current retirement point, the two deallocation equations never conflict. Thus, in the present invention, backup and retirement may occur simultaneously.

In a preferred implementation of the present invention, all sets are represented using a bit field. Essentially, a bit is used to represent membership of a physical register, whereby a "0" bit signifies non-membership, and a "1" bit signifies membership. Every physical register in register files 37–39 has an associated back-up RAM 92, and each back-up RAM 92 is indexed by checkpoint number. Each back-up RAM 92 (FIG. 7) stores copies of the alpha ($\alpha_I$) and visible ($V_I$) bits, at each checkpoint, for the physical register associated with that RAM 92. Accordingly, the back-up RAM 92 saves two bits per visible physical register 48 ($\alpha_I$, and $V_I$), therefore, in the preferred embodiment for "n" physical registers, each alpha and visible vector has "n" bits. Thus, if the SEQUENCER 20 allows "k" checkpoints, then each RAM 92 is organized as "k" by 2 by "n" bits. In addition to RAM 92, there are four latches 94, 96, 98 and 100 to save the current values of $V_c$, $\alpha_c$, $V_I$, and $\alpha_i$, respectively.

Each physical register 48 has an associated register inventory system 90 (FIG. 7). The Retire Freeable logic 97, Issue Free logic 101, and Back-up Freeable logic 108 are shown in FIG. 7 on a bit by bit basis. Accordingly, the distinct values of the set are denoted in plain text (i.e. $V_I$). The SEQUENCER 20 issues an instruction (checkpoint), by providing the associated checkpoint address bits [A1:A3] to the back-up RAM 92, and providing an ISSUE CONTROL signal to the latch 100. In the preferred embodiment, checkpoint address bit A1 represents the I-point, checkpoint address bit A2 represents the R-point, and checkpoint address bit A3 represents the B-point. If the issued instruction does not require any registers to be written, then no new physical registers are allocated by the LR CAMs 40–42. When the issued instruction requires the allocation of physical registers, the ALLOCATE signal will cause a physical register to be allocated, as described earlier. Accordingly, the ALLOCATE signal is asserted, and the currently latched alpha value $\alpha_i$ from latch 100 are provided the exclusive XOR-gate 101. The XOR-gate 101 uses the currently latched alpha value $\alpha_i$ to form the new value of $\alpha_{i+1}$ for the newly allocated physical register 48. This new value $\alpha_{i+1}$ is then copied into the back-up RAM 92 and becomes the new $\alpha_I$. The visible bit $V_I$, for the newly allocated physical register 48 is also copied into the RAM 92. After saving copies of the new alpha value $\alpha_{I+1}$ and visible bit $V_I$, the register inventory system 90 updates latch 98 and latch 100 with their new values. Accordingly, the alpha value and visible bit for each physical register allocated are saved in the back-up RAM 92 at the corresponding checkpoint address. Thus, for each checkpoint, the register inventory system 90 maintains a snapshot of the allocation of physical registers.

When the SEQUENCER 20 retires a set of checkpoints, the register inventory system 90 uses values read from the RAMs 92 to determine which physical registers to deallocate. The Retire Freeable logic 97 determines which physical registers to deallocate based upon the current values of the set of allocated visible registers $V_c$ and the exclusive set difference $\alpha_c \wedge \alpha_R$, in addition to the set of visible registers at the retirement point $V_R$. Accordingly, the SEQUENCER 20 asserts the RETIRE CONTROL signal, thereby enabling latches 94 and 96 to provide the currently stored values of $V_C$ and $\alpha_c$, respectively to the Retire Freeable logic 97, on a per bit basis. The currently stored values of $V_R$ and $\alpha_R$ are read out of the retire port of the back-up RAM 92 and provided to the Retire Freeable logic 97. Accordingly, XOR-gate 102 receives the currently stored value of $\alpha_c$ from latch 96, and $\alpha_R$ from the RAM 92 and provides the exclusive set difference $\alpha A = (\alpha_c \wedge \alpha_R)$ to a first input of OR-gate 104. OR-gate 104 receives the exclusive set difference $\alpha A$, and the currently stored value of $V_C$ from latch 94, and provides an output $(\alpha A + V_C)$ to gate 106. Gate 106 also receives at a second input terminal the currently stored value of $V_R$, which is inverted, and provides as an output the retirement deallocation equation $((\alpha A + V_C) \cdot V_R)$, on a per bit basis. Thus, the single bit output of gate 106 determines whether the associated physical register has become free due to retirement of an instruction which unmapped it. Accordingly, the collective output bits of gates 106 determine which physical registers are deallocated by the LR CAMs 40-42. Upon completion of the retirement, latches 94 and 96 are updated with values previously read from RAM 92, $V_R$ and $\alpha_R$, respectively.

When SEQUENCER 20 backs up to a specific checkpoint, the set of alpha values $\alpha_B$ read from RAMs 92 are combined with the exclusive set difference at issuance $\alpha_I$ to determine which physical registers are returned to the free pool. In the preferred embodiment of the present invention, back-up and issuance may not occur simultaneously. Consequently, when the BACK-UP CONTROL signal is asserted, the ISSUE CONTROL SIGNAL may not be asserted. By using the selected checkpoint, the inventory register system 90 restores both the alpha $(\alpha_I)$ and visible $(V_I)$ bits to the state they had at the time the checkpoint was issued. In doing so, the inventory register system 90 deallocates any allocated registers, $(\alpha_B \wedge \alpha_I)$, and returns the deallocated physical registers to the free pool. Accordingly, the SEQUENCER 20 asserts the BACK-UP CONTROL signal, thereby enabling latch 100 to provide the currently latched value of $\alpha_I$ to XOR-gate 108. The currently stored value of $\alpha_B$ is provided to gate 108 by RAM 92. XOR gate 108 receives the $\alpha_I$ and $\alpha_B$ values and provides an output which represents the exclusive difference between the stored alpha value at back-up $(\alpha_B)$, and the latched alpha value at issuance $(\alpha_I)$. Thus, the single bit output of gate 108 determines whether the associated physical register is returned to the free pool. Accordingly, the collective output bits of gates 106 determine which physical registers are returned to the free pool by the LR CAMs 40-42. Upon completion of the back-up, latches 76 and 100 are updated with values previously read from RAM 92, $V_B$ and $\alpha_B$, respectively.

In the present invention, system 90 maintains an inventory of the free status of each associated physical register using the free register inventory logic 103. Essentially, the free register inventory logic 103 keeps track of activities which return the associated physical register to the free pool, such as retirement, back-up, and an activity which removes registers from the free pool (i.e. allocation). A latch 114 stores the status of a "free" (F) bit, which indicates the status, free or not free, of an associated physical register. As previously indicated, at reset, all invisible physical registers are in the free pool, therefore, for all invisible physical registers in the register files 37-39, the free bit is set at set. OR-gate 110 has inputs coupled to the outputs of the Retire Freeable and Backup Freeable logic, 97 and 108, respectively, and an input coupled to the free latch 114. Whenever the SEQUENCER 20 retires a checkpoint, or backs-up to a checkpoint, gate 110 provides the status of the free bit to gate 112. Gate 112 also receives, at an inverted input, the ALLOCATE signal, and provides an output signal which defines the state of the "free" bit stored in latch 114. Collectively, the free register inventory logic 103 of system 90 maintains a list of the "free" physical registers, the "allocated" physical registers, those physical registers which are "freeable" due to retirement or backtracking by the SEQUENCER 20, and those physical registers which are not longer free due to allocation.

Thus, in the present invention, when the SEQUENCER 20 issues an instruction, the associated logical (architectural) register is quickly translated (mapped) to a physical register 48 by the LR CAMs 40-42, and a new checkpoint number is allocated for that instruction. Each physical register 48 in register files 37-39 has an associated three-port back-up RAM 92 which stores register information relevant to each checkpoint number. In the preferred embodiment, the back-up RAM 92 is two bits wide by a predetermined number of checkpoints deep. The back-up RAM 92 stores the values of the visible (V) and alpha ($\alpha$) bits, which represent the physical register's state changes (i.e. allocated visible, allocated invisible). The physical register's state changes are monitored by the register inventory system 90 of the LR CAMs 40-42. When the SEQUENCER 20 needs to back-up to a specific checkpoint, the alpha and visible bit values are read from the back-up RAM 92 and used by the register inventory system 90 to determine which registers are returned to the free pool. Similarly, when the instruction is complete (DONE), the instruction is retired and the register inventory system 90 determines those physical registers which are returned to the free pool. The Retire Freeable logic 97 and Back-up Freeable logic 108 of system allow simultaneous instruction retirement and back-up to occur in a predefined unit of time.

While the invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

We claim:

1. In a data processing system having a predetermined number of execution units for simultaneously executing a plurality of instructions issued by a sequencer, and a plurality of numbered physical registers in a register file for selectively storing information resulting from execution by said execution units of each of said predetermined number of instructions, means for performing instruction retirement comprising:

first means, coupled to each of said plurality of numbered physical registers, for monitoring and storing an allocation state change of each of said plurality of numbered physical registers, in response to said sequencer advancing from a first consistent checkpoint to a subsequent retirement checkpoint, said first means storing for each of said plurality of numbered physical registers at least an allocation state bit and a visible state bit at each of a predetermined number of checkpoints between said first consistent checkpoint and said subsequent retirement checkpoint, said first means being capable of being indexed by said sequencer using checkpoint numbers; and second means, coupled to said first means, for evaluating a retirement deallocation equation using NRZ encoding to determine which of said plurality of numbered physical registers to deallocate, in response to said sequencer retiring a completed instruction; said second comprising:

a first logic portion for reading from said first means, for each of said plurality of numbered physical registers, at least said allocation state bit and said visible state bit at said first consistent checkpoint and said subsequent retirement point; and a second logic portion, coupled to said first logic portion and said first means, for retrieving said allocation state bit and said visible state bit from said first logic portions and for evaluating said set of physical register allocation changes using NRZ encoding, said second logic portion providing, for each numbered physical register, an output signal in response to evaluating said set of physical register allocation changes, said output signal deallocating each of said numbered physical registers which has become a free physical register as a result of said sequencer retiring said completed instruction.

2. The means for performing instruction retirement of claim 1 wherein said first means comprises a random access memory.

3. In a data processing system having a predetermined number of execution units for simultaneously executing a plurality of instructions issued by a sequencer, and a plurality of numbered physical registers in a register file for selectively storing information resulting from execution by said execution units of each of said predetermined number of instructions, means for performing instruction backtracking comprising:

first means, coupled to each of said plurality of numbered physical registers, for monitoring and storing an allocation state change of each of said plurality of numbered physical registers, in response to said sequencer discarding a stream of instructions issued between a first back-up checkpoint and a subsequent issue checkpoint, said first means storing for each of said plurality of numbered physical registers at least an allocation state bit and a visible state bit at each of a predetermined number of checkpoints between said first back-up checkpoint and said subsequent issue checkpoint, said first means being capable of being indexed by said sequencer using checkpoint numbers; and second means, coupled to said first means, for evaluating a back-up deallocation equation using NRZ encoding to determine which of said plurality of numbered physical registers to deallocate, in response to said sequencer backtracking to said first back-up checkpoint, said second means using said allocation state bit and said visible state bit, representing said allocation state change of each of said predetermined numbered physical registers between said consistent checkpoint, to determine which of said numbered physical registers to return to a register free pool: said second means comprising;

a first logic portion for reading from said first means, for each of said plurality of numbered physical registers, at least said allocation state bit and said visible state bit at said first back-up checkpoint and said subsequent issue checkpoint, said first means being capable of being indexed by said sequencer using checkpoint numbers; and a second logic portion, coupled to said first logic portion, for retrieving said allocation state bit and said visible state bit from said first means and for evaluating said set of physical register allocation changes using NRZ encoding said second logic portion providing, for each numbered physical register, an output signal in response to evaluating said set of physical register allocation changes, said output signal deallocating each of said numbered physical registers which has become a free physical register as a result of said sequencer backtracking to said first back-up checkpoint.

4. The means for performing instruction backtracking of claim 3 wherein said first means comprises a random access memory.

5. In a data processing system having a predetermined number of execution units for simultaneously executing a plurality of instructions issued by a sequencer, and a plurality of numbered physical registers in a register file for selectively storing information resulting from execution by said execution units of each of said predetermined number of instructions, means for performing simultaneous instruction retirement and backtracking comprising:

first means for monitoring and storing an allocation state change of each of said physical registers, in response to said sequencer advancing from a first consistent checkpoint to a subsequent retirement checkpoint, said first means storing, at each of a plurality of checkpoints in between said first consistent checkpoint and said subsequent retirement checkpoint, an allocation state bit and a visible state bit for each of said physical registers; and second means, coupled to said first means, for simultaneously evaluating a retirement deallocation equation and a backtracking deallocation equation using NRZ encoding, in response to said sequencer discarding a stream of instructions issued between a first back-up checkpoint and a subsequent issue checkpoint, said second means evaluating said retirement deallocation equation and said backtracking deallocation equation to determine which physical registers to deallocate and return to a free pool of registers; said second means comprising;

a first logic portion for reading from said first means, for each of said plurality of numbered physical registers, at least said allocation state bit and said visible state bit at said first back-up checkpoint and said subsequent issue checkpoint, said first means being capable of being indexed by said sequencer using checkpoint numbers; and a second logic portion coupled to said first logic portion for retrieving, for each of said numbered physical registers, said allocation state bit and said visible state bit at said first back-up checkpoint and said subsequent issue checkpoint and for evaluating a first set of physical register allocation changes using NRZ encoding, said second logic portion providing for each numbered physical register, a first output signal in response to performing such evaluation, said first output signal deallocating each of said numbered physical registers which has become free as a result of said sequencer backtracking to said first back-up checkpoint and a third logic portion coupled to said first logic portion for simultaneously retrieving, for each of said numbered physical registers, said allocation state bit and said visible state bit at said consistent checkpoint and a subsequent retirement checkpoint, and for evaluating a second set Of physical register allocation changes using NRZ encoding, said third logic portion providing, for each numbered physical register, a second output signal in response to performing such evaluation, said second output signal deallocating each of said numbered physical registers which has become free as a result of said sequencer retiring said completed instruction.

6. The means for performing simultaneous instruction retirement and backtracking of claim 5 wherein said first means comprises a random access memory.

7. In a data processing system having a predetermined number of execution units for simultaneously executing a plurality of instructions issued by a sequencer, and a plurality of numbered physical registers in a register file for selectively storing a plurality of data values resulting from execution by said execution units of each of said predetermined number of instructions, means for performing simultaneous instruction retirement and backtracking comprising:

first means for monitoring and storing an allocation state change of each of said numbered physical registers, in response to said sequencer advancing from a first consistent checkpoint to a retirement checkpoint, said first means being capable of being indexed by said sequencer using checkpoint numbers; and second means, coupled to said first means, for receiving an allocation state bit and a visible state bit for each of said numbered physical registers, and for evaluating a set of register deallocation equations using NRZ encoding, to determine which of said numbered physical registers to deallocate, while said sequencer simultaneously discards a stream of instructions issued between a backup checkpoint and said retirement checkpoint, said second means comprising:

a first logic portion for reading from said first means, for each of said plurality of numbered physical registers, at least said allocation state bit and said visible state bit at said first back-up checkpoint and said subsequent issue checkpoint; and a second logic portion, coupled to said first logic portion, for simultaneously retrieving., for each of said numbered physical registers, said allocation state bit and said visible state bit at said consistent checkpoint and a subsequent retirement checkpoint, and for evaluating a second set of physical register allocation changes using NRZ encoding, said third logic portion providing, for each numbered physical register, a second output signal in response to performing such evaluation, said second output signal deallocating each of said numbered physical registers which has become free as a result of said sequencer retiring said completed instruction; and wherein none of said plurality of data values are transferred between said numbered physical registers during performance of monitoring and evaluation by said first means and said second means, respectively.

8. The means for performing simultaneous instruction retirement and backtracking of claim 4 wherein said first means comprises a random access memory capable of being accessed by said sequencer using checkpoint numbers 9. In a data processing system having a predetermined number of execution units for simultaneously executing a plurality of instructions issued by a sequencer, and a plurality of numbered physical registers in a register file for selectively storing a plurality of data values resulting from execution by said execution units of each of said predetermined number of instructions, means for performing simultaneous instruction retirement and backtracking comprising:

storage means coupled to each of said plurality of numbered physical registers for selectively retrieving and storing a first set of bits, in response to a first control signal from said sequencer, and for selectively retrieving and storing a second set of bits in response to a second control signal from said sequencer;

retirement means coupled to said storage means for evaluating an allocation state change of each of said numbered physical registers, in response to said sequencer advancing from a first consistent checkpoint to a subsequent retirement checkpoint, said retirement means retrieving said first set of bits and logically combining said first set of bits, using NRZ encoding, to determine whether to deallocate said unique physical register at a retirement checkpoint, and providing a first output deallocation signal representative thereof;

backtrack means, coupled to said storage means, for simultaneously evaluating said allocation state change of each of said numbered physical registers, in response to said sequencer discarding a stream of instructions issued between a first checkpoint and a subsequent issue checkpoint, said backtrack means retrieving said second set of bits and logically combining said second set of bits, using NRZ encoding, to determine whether to deallocate one or more of said numbered physical registers at a back-up checkpoint, and providing a second output deallocation signal representative thereof;

means coupled to said retirement means and said backtrack means for logically combining said first output deallocation signal and said second output deallocation signal to define a set of physical registers which are available for reallocation by said sequencer; and wherein none of said plurality of data values are transferred between said numbered physical registers during performance of monitoring and evaluation by said retirement means and said backtrack means, respectively.

* * * * *